US008065705B2

(12) United States Patent
Kawai

(10) Patent No.: US 8,065,705 B2
(45) Date of Patent: Nov. 22, 2011

(54) BROADCASTING DEVICE SELECTING PROGRAM INFORMATION BASED ON SEARCH CONDITIONS

(75) Inventor: Masahiro Kawai, Osaka (JP)

(73) Assignee: Panasonic Corporation, Osaka (JP)

( * ) Notice: Subject to any disclaimer, the term of this patent is extended or adjusted under 35 U.S.C. 154(b) by 546 days.

(21) Appl. No.: 11/908,459

(22) PCT Filed: Apr. 11, 2006

(86) PCT No.: PCT/JP2006/307614
§ 371 (c)(1),
(2), (4) Date: Sep. 12, 2007

(87) PCT Pub. No.: WO2006/109787
PCT Pub. Date: Oct. 19, 2006

(65) Prior Publication Data
US 2009/0007209 A1    Jan. 1, 2009

(30) Foreign Application Priority Data
Apr. 12, 2005   (JP) .................................. 2005-114136

(51) Int. Cl.
*G06F 3/00* (2006.01)
*H04N 7/173* (2011.01)
*H04N 5/50* (2006.01)
*H04N 5/445* (2011.01)

(52) U.S. Cl. ........... 725/53; 725/134; 348/732; 348/563
(58) Field of Classification Search ................ 725/53, 725/46, 114, 115, 131, 134, 138, 139, 142, 725/144, 145, 151; 348/732, 563
See application file for complete search history.

(56) References Cited

U.S. PATENT DOCUMENTS

| 5,515,106 | A | 5/1996 | Chaney et al. |
|---|---|---|---|
| 5,642,153 | A | 6/1997 | Chaney et al. |
| 6,874,160 | B1 * | 3/2005 | Herz ................................ 725/58 |
| 7,454,401 | B2 * | 11/2008 | Yamamoto et al. ................... 1/1 |
| 2002/0087984 | A1 | 7/2002 | Maeda et al. |
| 2005/0223405 | A1 * | 10/2005 | Iizuka et al. ..................... 725/52 |
| 2006/0031882 | A1 * | 2/2006 | Swix et al. ....................... 725/46 |
| 2006/0095543 | A1 * | 5/2006 | Ito et al. ......................... 709/218 |
| 2006/0235832 | A1 | 10/2006 | Kim |

FOREIGN PATENT DOCUMENTS

| CN | 1362687 A | 8/2002 |
|---|---|---|
| EP | 0 662 771 A1 | 7/1995 |
| JP | 03-129570 A | 6/1991 |
| JP | 06-243170 A | 9/1994 |
| JP | 08-070451 | 3/1996 |
| JP | 08-070451 A | 3/1996 |
| JP | 09-083888 | 3/1997 |
| JP | 9-83888 A | 3/1997 |
| JP | 2003-169312 A | 6/2003 |
| JP | 2005-032150 A | 2/2005 |
| JP | 2006-279953 A | 10/2006 |

OTHER PUBLICATIONS

International Search Report for Application No. PCT/JP2006/307614 dated Apr. 11, 2006.

* cited by examiner

*Primary Examiner* — Hoang-Vu A Nguyen-Ba
(74) *Attorney, Agent, or Firm* — RatnerPrestia

(57) ABSTRACT

A broadcasting device and a receiver excellent in responsiveness are obtainable through transmitting program information, organized by condition and including a program satisfying a search condition, from a broadcasting station.

2 Claims, 9 Drawing Sheets

FIG. 2

| Program identifier | Channel | On-air start time | Genre | Cast | Title of program |
|---|---|---|---|---|---|
| 1912 | 100 | 5/1 0:00 | News | Yamada, Kimura | Midnight news |
| 1913 | 100 | 5/1 3:45 | Foreign movie | Tom, Alice | Midnight theater |
| 1914 | 100 | 5/1 5:00 | News | Yamada, Sato | Early morning news |
| | | | | | |
| 2129 | 100 | 5/8 19:00 | News | Kimura | Nationwide weather report |
| 2130 | 100 | 5/8 20:00 | Foreign movie | Tom, George | Saturday theater |
| 2131 | 100 | 5/8 22:30 | Variety | Kimura | Variety program |

FIG. 3

| Search condition | Member of searched programs | Program identifier | | | |
|---|---|---|---|---|---|
| Genre : Foreign movie | 2 | 1913 | 2130 | ........ | ........ |
| Genre : News | 3 | 1912 | 1914 | 2129 | ........ |
| Genre : Variety | 1 | 2131 | ........ | ........ | ........ |
| | | | | | |
| Cast : Yamada | 2 | 1912 | 1914 | ........ | ........ |
| Cast : Kimura | 3 | 1912 | 2129 | 2131 | ........ |
| Cast : Tom | 2 | 1913 | 2130 | ........ | ........ |
| Cast : Alice | 1 | 1913 | ........ | ........ | ........ |
| | | | | | |
| Genre : News and Cast : Yamada | 2 | 1912 | 1914 | ........ | ........ |
| | | | | | |

FIG. 4

| |
|---|
| Cast : Kimura |
| Genre : Foreign movie |
| Genre : Foreign music |
| Genre : News |
| Keyword : Olympic |
| Genre : News and Cast : Yamada |

FIG. 5A

| Search condition | Member of searched programs | Program identifier | | | |
|---|---|---|---|---|---|
| Genre : Foreign movie | 2 | 1913 | 2130 | ········ | ········ |
| Genre : News | 3 | 1912 | 1914 | 2129 | ········ |
| Cast : Kimura | 3 | 1912 | 2129 | 2131 | ········ |
| Genre: News and Cast : Yamada | 2 | 1912 | 1914 | ········ | ········ |

FIG. 5B

| Program identifier | Channel | On-air start time | Genre | Cast | Title of program |
|---|---|---|---|---|---|
| 1913 | 100 | 5/1 3:45 | Foreign movie | Tom, Alice | Midnight news |
| 2130 | 100 | 5/8 20:00 | Foreign movie | Tom, George | Saturday theater |
| ~ | | | | | ~ |
| 1912 | 100 | 5/1 0:00 | News | Yamada, Kimura | Midnight news |
| 1914 | 100 | 5/1 5:00 | News | Yamada, Sato | Early morning news |
| 2129 | 100 | 5/8 19:00 | News | Kimura | Nationwide weather report |
| ~ | | | | | ~ |
| 1912 | 100 | 5/1 0:00 | News | Yamada, Kimura | Midnight news |
| 2129 | 100 | 5/8 19:00 | News | Kimura | Nationwide weather report |
| 2131 | 100 | 5/8 22:30 | Variety | Kimura | Variety program |
| ~ | | | | | ~ |
| 1912 | 100 | 5/1 0:00 | News | Yamada, Kimura | Midnight news |
| 1914 | 100 | 5/1 5:00 | News | Yamada, Sato | Early morning news |

BROADCASTING DEVICE SELECTING PROGRAM INFORMATION BASED ON SEARCH CONDITIONS

This Application is A U.S. National Phase Application of Pct International Application PCT/JP2006/307614.

TECHNICAL FIELD

The present invention relates to a broadcasting device which transmits program information about organized programs and a receiver which receives the program information in digital broadcasting.

BACKGROUND ART

The digital broadcasting provides clients with a commercial service which allows a broadcasting device to transmit the information about editing programs to be on-aired as EPG (Electronic Program Guide) data multiplexed on the broadcast wave, and the service also allows a receiver to receive the EPG data to be used in the receiver. Use of this EPG data allows displaying programs scheduled on-air on a TV screen as a program timetable, or searching through a number of programs for ones that meet specific conditions before displaying the ones hit by the search. For instance, "display only movie programs" is established as a specific condition, then movie programs are extracted and displayed on a TV screen.

The EPG data is formed of an identifier and an attribute of respective programs. The program identifier is the information for identifying a program, and is assigned uniquely to each program. The program attribute is the information indicating characteristics and content of the program, and includes a title, an on-air start time, a genre, the cast, or a detailed description of the program.

The program search function is this: viewer's designation of a program attribute as a search key prompts the program search function to search through the organized programs for ones satisfying the search key, and then to show the satisfying programs to the viewer. For instance, this function allows searching through the weekly programs for movie programs only, or for the programs where the president of the US appears.

FIG. 7 shows a block diagram illustrating structures of a conventional broadcasting device and its receiver. In FIG. 7, broadcasting device 14 includes program material memory 10 storing numerous materials of the programs scheduled on-air, and program information memory 11 storing numerous program information. Each one of the program information is formed of a program identifier and a program attribute. The program attribute includes a title, an on-air start time, a genre and so on. Multiplexer 13 multiplexes the data stored in memories 10 and 11 on the broadcast wave to be transmitted.

Receiver 29 includes decoder 21 which extracts the data multiplexed on the broadcast wave, and program data storage 23 stores program data extracted from the broadcast wave. Input section 24 receives input operation done by a user. Using a search condition entered through input section 24 as a search key, search section 25 searches storage 23 for a program satisfying the search key, and then extracts and outputs the satisfying program. Search result memory 26 stores the searched (satisfying) program output from search section 25. Output section 28 outputs the searched program and displays it to the viewer.

FIG. 8 shows a flowchart illustrating operation of the conventional receiver. Every program sent from the broadcasting device undergoes the search one by one (S801). To be more specific, parameter "i" is incremented sequentially, thereby searching program "i". Then only the program satisfying the specific conditions is extracted (S802). The data of the program is stored in search result memory 26 (S803). The search ends after every program has undergone the search (S804). This related art is disclosed in Unexamined Japanese Patent Publication No. H09-83888.

Conventionally, the program search has been implemented by a processor placed in the receiver. In general, the memory and the processor in the receiver are not so sophisticated, so that several minutes are needed sometime for searching through all the programs for the program satisfying a specific condition. It is slow enough for a user to get a search result.

DISCLOSURE OF INVENTION

The present invention aims to provide a broadcasting device and a receiver having a program searching function excellent in responsiveness by means of transmitting program information, which includes programs satisfying search conditions and is organized by condition, from a broadcasting station.

The broadcasting device and the receiver of the present invention work in the following digital broadcasting environment: numerous digital data compressed by MPEG method and the like are stored to be served, and various data are multiplexed on the broadcast wave according to a predetermined program organization before they are transmitted. The broadcasting device of the present invention comprises the following elements:

a program material memory for storing numerous program materials such as videos and audios;

a program information memory for storing the information about respective programs such as a program identifier, title, on-air starting time, genre and so on;

a program information analyzer for analyzing the program information stored in the program information memory based on predetermined search conditions;

a program-by-condition information memory for storing the identifier of the program resulting from the analysis; and a multiplexer for multiplexing the program materials, program information and searched program information before they are transmitted.

The receiver of the present invention comprises the following elements:

a decoder for receiving digital broadcasting, and then separating as well as extracting signals multiplexed on the broadcast wave;

a first search-result memory for storing the identifier of the program, which is extracted from the broadcast wave and satisfies a predetermined search condition;

a program data storage for storing the data of the program such as an identifier, title, on-air starting time, genre extracted from the broadcast wave;

an input section for inputting search conditions;

a search section for searching the program data storage for a program satisfying the condition supplied from the input section;

a second search-result memory for storing the program supplied from the search section and satisfying the search condition;

a selector for selecting one of contents stored in the first search-result memory or the second search-result memory; and an output section for displaying a program selected by the selector.

The receiver searches both of the first and the second search-result memories for a program satisfying the search condition.

The broadcasting device and the receiver of the present invention embody a program search function excellent in responsiveness by means of transmitting the program information organized by condition from a broadcasting station, which information includes programs satisfying search conditions.

BRIEF DESCRIPTION OF THE DRAWINGS

FIG. 2 shows an instance of program information in accordance with the first embodiment of the present invention.

FIG. 3 shows an instance of program information organized by condition in accordance with the first embodiment of the present invention.

FIG. 4 shows an instance of content stored in a search condition memory in accordance with the first embodiment of the present invention.

FIG. 5A shows an instance of content stored in a search result memory in accordance with the first embodiment of the present invention.

FIG. 5B shows an instance of displayed content of a first search result in accordance with the first embodiment of the present invention.

Figure 1:
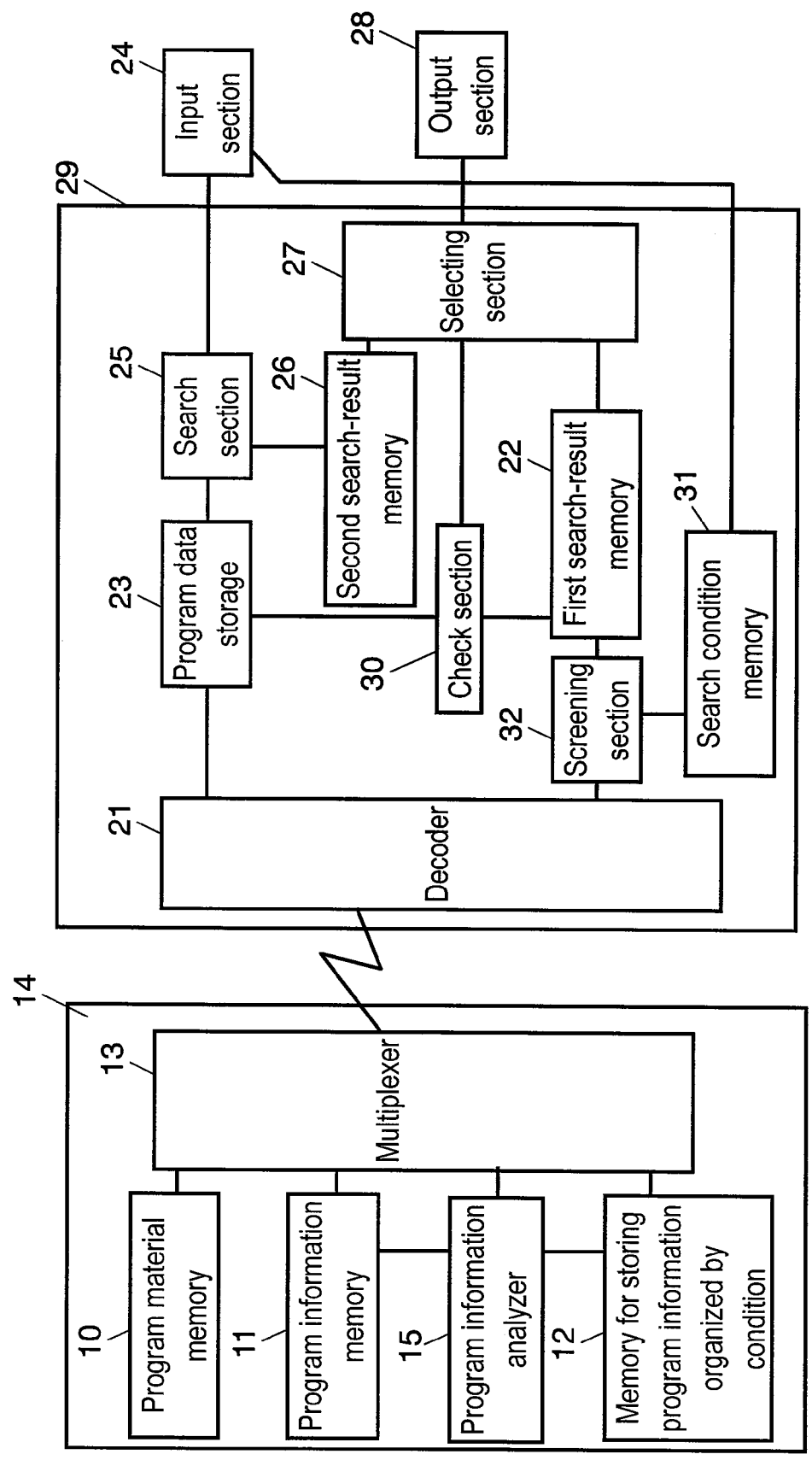
FIG. 1 shows a block diagram illustrating structures of a broadcasting device and a receiver in accordance with a first embodiment of the present invention.

DESCRIPTION OF REFERENCE MARKS 10 program material memory
11 program information memory
12 memory for storing program information organized by condition
13 multiplexer
14 broadcasting device
15 program information analyzer
21 decoder
22 first search-result memory
23 program data storage
24 input section
25 search section
26 second search-result memory
27 selecting section
28 output section
29 receiver
30 check section
31 search condition memory
32 screening section

DESCRIPTION OF PREFERRED EMBODIMENT

A broadcasting device and a receiver of the present invention are demonstrated hereinafter with reference to the accompanying drawings.

Exemplary Embodiment 1

FIG. 1 shows a block diagram of a broadcasting device and a receiver in accordance with the first embodiment of the present invention. In FIG. 1, broadcasting device 14 includes program material memory 10, which stores numerous materials of the programs to be on-aired. Program information memory 11 stores a lot of information about each one of the programs. This program information is formed of a program identifier and a program attribute which includes a title, channel number, on-air start time, genre of a program, and so on.

Program information analyzer 15 analyzes the program information stored in memory 11 based on a predetermined search condition. Memory 12 for storing program information organized by condition stores an identifier of the program which satisfies the search condition and is analyzed by analyzer 15. Multiplexer 13 multiplexes the data stored in memories 10 and 11 before transmitting those data on a broadcast wave.

Receiver 29 includes decoder 21 which separates and extracts the data multiplexed on the broadcast wave. Program data storage 23 stores the program data separated and extracted from the broadcast wave. Input section 24 receives the input operation done by a viewer. Search section 25 uses the search condition supplied from input section 24 as a search key, and searches storage 23 for a program satisfying the search condition, and then extracts and outputs the program hit by the search. Second search-result memory 26 stores the program hit by the search and supplied from search section 25. Output section 28 outputs the program hit by the search for showing it to the viewer.

First search-result memory 22 stores identifiers of the programs that are extracted from the broadcast wave and satisfy predetermined search conditions. Check section 30 checks whether or not program data storage 23 stores the program information having the identical identifier to that stored in first search-result memory 22. Selecting section 27 selects one of the contents of memory 22 or memory 26, and then outputs and shows a search-result list to the viewer. Search condition memory 31 stores the search condition given by the viewer through input section 24. Screening section 32 screens the program information organized by condition and extracted from the broadcast wave by decoder 21, and sorts out the ones satisfying the search condition stored in memory 31, and then outputs the ones. Actually structural elements other than what is discussed above are necessary for receiving broadcasting, displaying program materials such as videos and audios, or obtaining a time; however, since they are not key items of the present invention, the descriptions thereof are omitted here.

Operation of the broadcasting device of the present invention is demonstrated hereinafter. Respective materials such as videos, audios and data of the programs to be on-aired are stored in program material memory 10 following the predetermined organization of programs. Program information memory 11 stores a lot of program information corresponding to the program organization.

FIG. 2 lists contents of the program information. In FIG. 2, the program information is formed of six pieces of information: an identifier of each one of programs, channel number, on-air start time, genre, the cast, and the title of a program. Program information analyzer 15 analyzes identifiers of the respective programs satisfying the predetermined search condition. The program information resulting from the analysis is numerously stored in program-information-by-condition memory 12 placed in device 14.

FIG. 3 lists contents of memory 12 storing the program information organized by condition. This information is formed of search conditions and identifiers of programs applicable to the search conditions. In FIG. 3, three genres are presented, i.e. foreign movie, news, and variety, and the number of programs hit by search, and the identifiers of those programs. Another search condition, i.e. the cast, Yamada, Kimura, Tom, and Alice are presented, and the number of programs hit by the search and the identifiers of those programs are listed. A plurality of search conditions (in FIG. 3, AND of news and the cast) can also identify the number of programs and the identifiers of those programs.

The content shown in FIG. 3 is an example, and the present invention is not limited to this example. A specific identifier can be selected based on another program information, for instance, a frequency of appearance of the cast is used as a parameter, and programs where a specific cast appears three times or more can be extracted.

If a past analysis showed that movies won popularity; however, the analysis this time shows that dramas win more popularity than movies. Then the information about the cast of dramas can be used for setting a new search condition. Selection of programs according to this new search condition allows increasing the possibility of responding to viewer needs more accurately.

Broadcasting device 14 reads the materials, to be transmitted following the program organization, from program material memory 10 and also reads the program information from program information memory 11 as well as memory 12 storing program information organized by condition. Multiplexer 13 multiplexes these materials and information on a broadcast wave for transmitting. Broadcasting device 14 always performs the foregoing operation.

Next, operation of receiver 29 is demonstrated hereinafter. Decoder 21 extracts and outputs the data multiplexed on the broadcast wave, and program data storage 23 stores program data based on the program organization. In this instance, the program information shown in FIG. 2 is stored in storage 23. Decoder 21 also outputs the program information organized by condition and corresponding to the program organization, and selecting section 32 receives the output. In this instance, the information shown in FIG. 3 is supplied to selecting section 32.

The search conditions viewers are interested in are stored in search condition memory 31. FIG. 4 lists contents stored in memory 31. A viewer can input search conditions through input section 24. Screening section 32 compares the search condition in the program information organized by condition and supplied from decoder 21 with the search condition stored in memory 31. When both the conditions agree with each other, screening section 32 outputs this search condition and its identifier as one pair, then first search-result memory 22 stores this pair. FIG. 5A lists contents stored in memory 22.

Check section 30 checks the program information stored in memory 22 against that stored in storage 23. If check section 30 finds some inconsistency, the inconsistency is removed before the program information is stored in its built-in memory (not shown), and then outputs the information to selecting section 27. An instance of the inconsistency is this: an identifier stored in first search result memory 22 is not stored in program data storage 23. In this case, the search result excluding this identifier is stored in the built-in memory (not shown) before it is supplied to selecting section 27.

When the program information in the same time-slot has an identifier stored in first search-result memory 22, however, its identifier stored in program data storage 23 is different from that stored in memory 22. In such a case, the program of which identifier is updated more recently is selected. This process can eliminate an inconsistency.

Next, the operation when a viewer instructs the receiver to search a program is demonstrated hereinafter. The viewer inputs a search condition and a search instruction through input section 24. The search condition and the search instruction are stored in search condition memory 31, and are compared by screening section with the program information organized by condition and sent from broadcasting device 14. When the identifier in response to the search condition input through input section 24 or the search condition per se agrees with the identifier or the search condition per se included in the program information organized by condition, the pair of the agreeing search condition and its identifier are stored in first search-result memory 22 as a first search result.

In check section 30, the program identifier resulting from the first search and stored in search-result memory 22 is checked against the program identifier stored in program data storage 23, and then another program information (e.g. channel number, on-air start time, genre, the cast, and title) corresponding to the program identifier is extracted from storage 23. The extracted information is sent to selecting section 27 via check section 30. Selecting section 27 organizes the extracted program information by search condition, and the information is displayed by output section 28.

FIG. 5B shows displayed content of the first search result in accordance with this first embodiment. In FIG. 5B, the programs are displayed based on the search conditions shown in FIG. 4 and FIG. 5A. For instance, programs falling under a genre of foreign movie, programs falling under a genre of news, are grouped respectively.

Figure 6A:
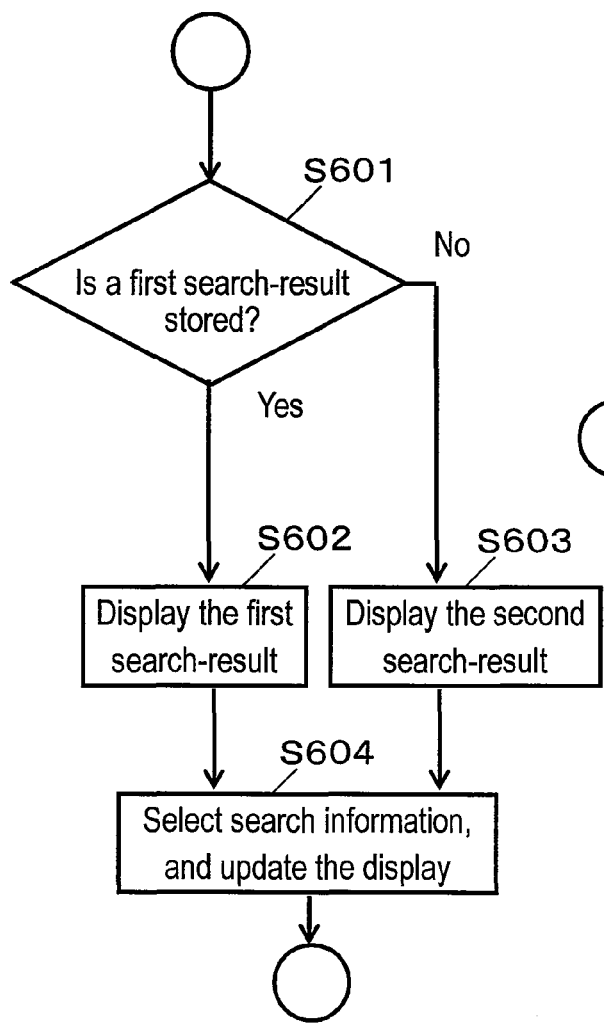
FIG. 6A shows a flowchart illustrating the operation of a selecting section placed in a receiver in accordance with the first embodiment of the present invention.

FIG. 6A shows a flowchart of operation of selecting section 27 placed in the receiver in accordance with this embodiment. In FIG. 6A, when selecting section 27 stores the first search result (YES in S601), the first search result is displayed (S602, S604). In this way, transmission of the program information, organized by condition and including the program that satisfies the search condition, from the broadcasting device allows obtaining a program search function excellent in responsiveness.

If program information, organized by condition and including a program that satisfies a search condition, is not available (NO in S601), search section 25 placed in receiver 29 uses the search condition supplied through input section 24 in order to search storage 23 for a program that satisfies the search condition, and extracts the satisfying program from storage 23.

Figure 6B:
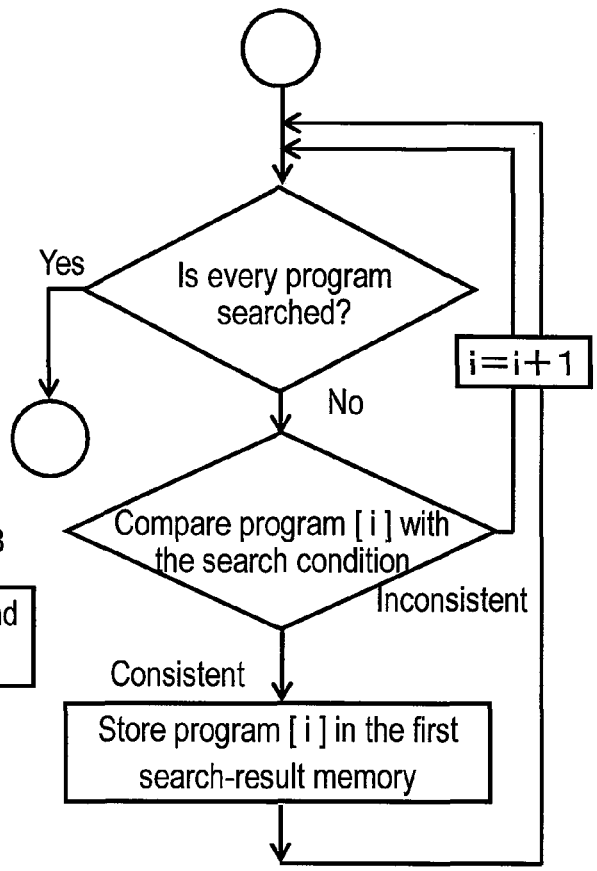
FIG. 6B shows a flowchart illustrating the operation of a search section placed in the receiver in accordance with the first embodiment of the present invention.
Figure 7:
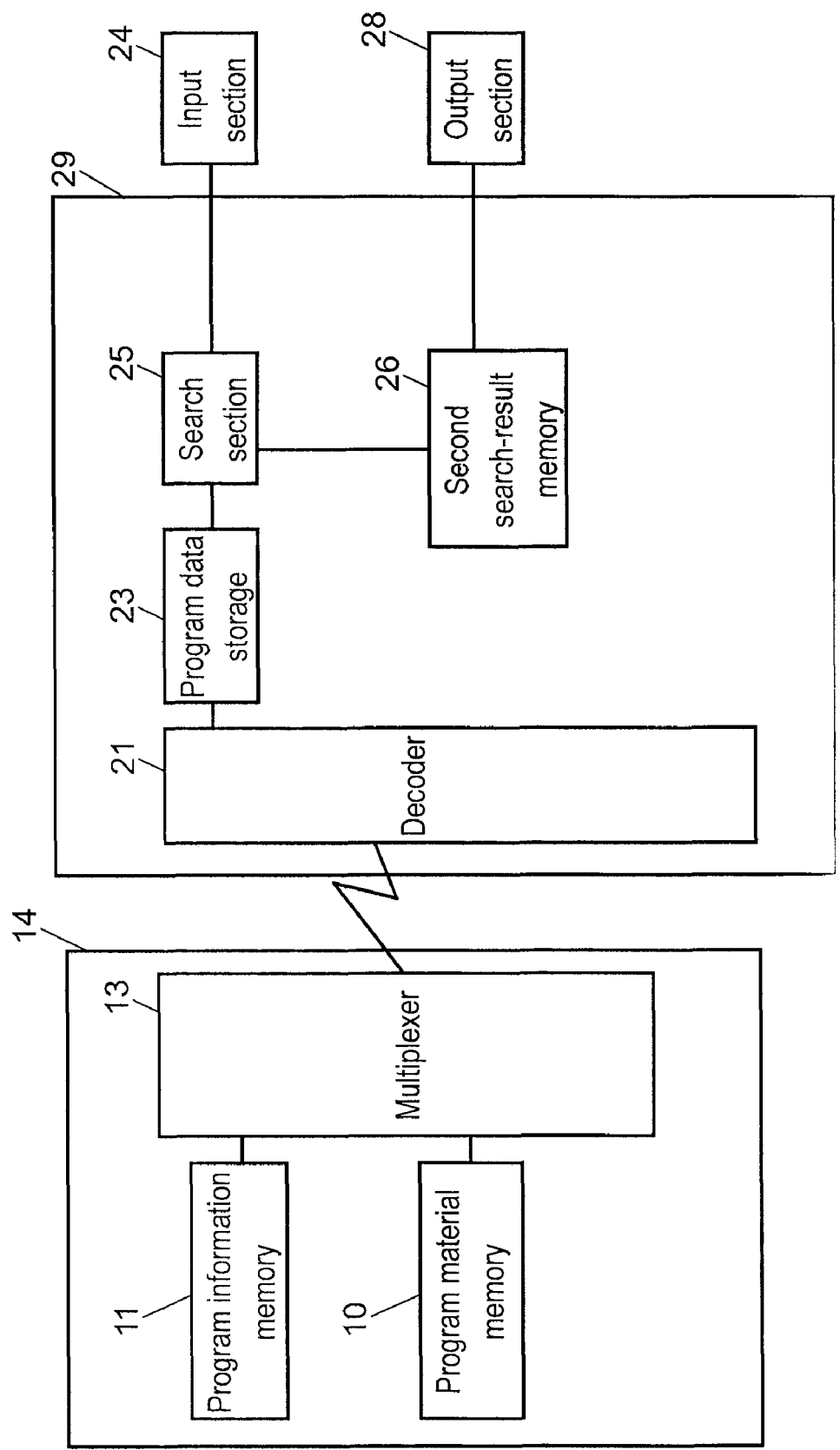
FIG. 7 shows structures of a conventional broadcasting device and a conventional receiver.
Figure 8:
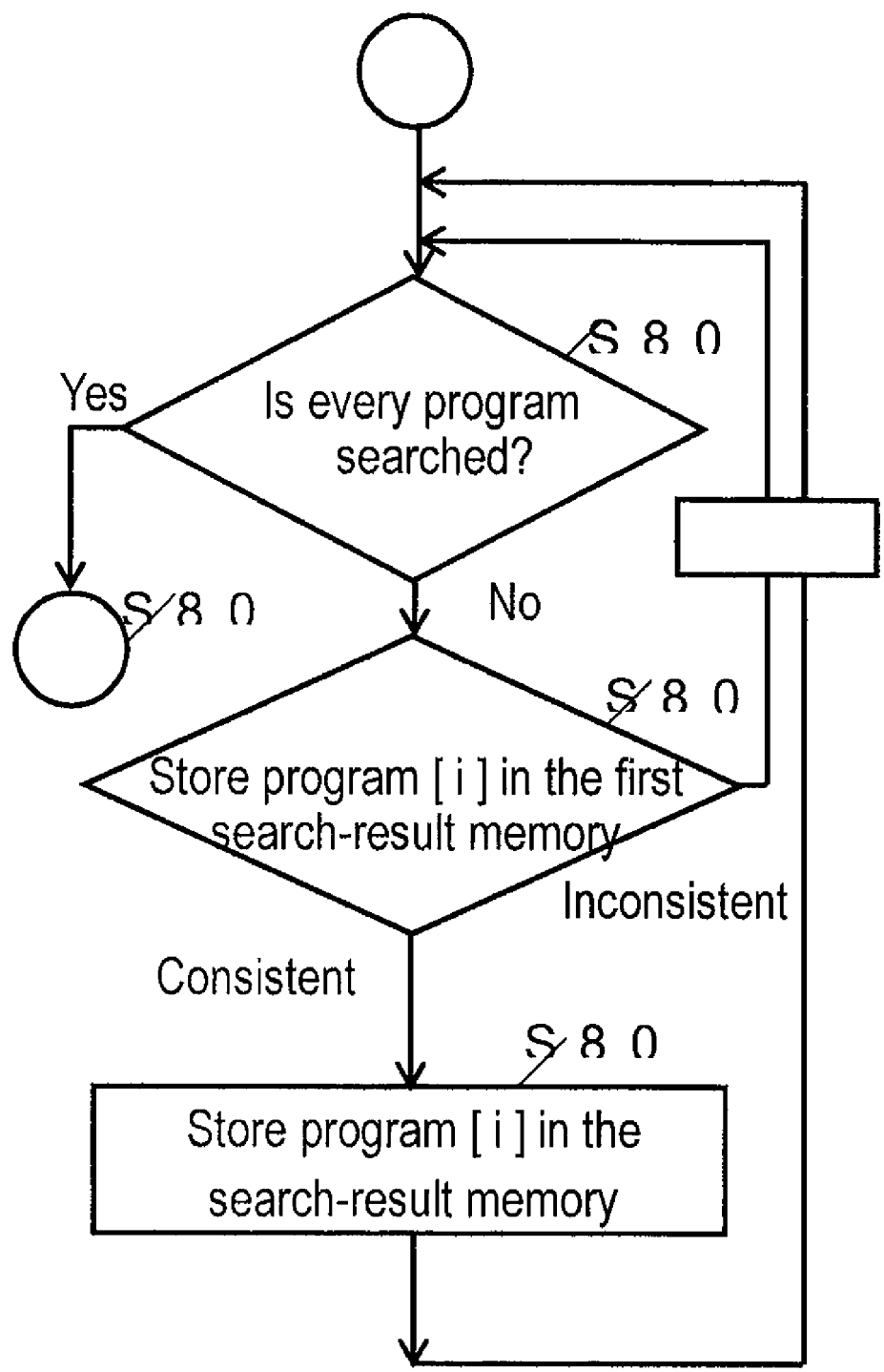
FIG. 8 shows a flowchart illustrating the operation of the conventional receiver.

FIG. 6B shows a flowchart of operation of search section 25. In FIG. 6B, the extracted program information is output as a second search result from search section 25 and stored in second search-result memory 26, and then sent to selecting section 27, which organizes the second search result by search condition, and then the organized search result is displayed on output section 28. The operation in FIG. 6B corresponds to the operation in S603 of FIG. 6A.

As discussed above, even if no program information organized by condition and having a program that satisfies a search condition is available, the second search result can be obtained, so that a viewer can acknowledge the program information satisfying the search condition. However, the second search result takes time as much as conventional one before it is available, so that obtaining the first search result is desirable.

In this first embodiment of the present invention, the program information contains the following six items; an identifier, channel number, on-air start time, genre, the cast, and a title of a program. However, the information can include various items such as a viewing fee, keyword, etc.

The program information organized by condition and sent to selecting section 32 can include not only a program identifier but also another program information. Then check section 30 can save a process time of extracting necessary program information from program data storage 23.

In this first embodiment, a viewer inputs a search condition through input section 24 to search condition memory 31, however, this input can be done by other means. For instance, the input can be done based on an algorithm of holding a given number of records of search conditions used in program search done by viewers, or another algorithm of setting a search condition not by a viewer's operation but by some other automatic process.

When the program information organized by condition is compiled in the broadcasting device, it is very useful if viewers' needs are sent directly from the receiver. Thus both of the broadcasting device and the receiver are equipped with communicating sections for transmitting or receiving search conditions or program information viewers are interested in. The program search function excellent in responsiveness is thus obtainable.

In this first embodiment, the program information organized by condition is analyzed and compiled in the broadcasting device; however, this can be done in respective receivers provided that the analysis and compiling are done while no viewers watch programs so as not to increase the load to the processors placed in the receivers. In this case, program information can be selected in response to the needs or tastes of the viewers using the receivers, so that programs more accurately fit to viewers' needs can be provided.

INDUSTRIAL APPLICABILITY

A broadcasting device and a receiver of the present invention can obtain a program search function excellent in responsiveness by transmitting program information, organized by condition and including programs satisfying search conditions, from a broadcasting station. The receiver selects and stores the program information satisfying a predetermined condition, thereby displaying a search result having no inconsistency. The present invention is thus useful particularly for receiving digital broadcasting.

The invention claimed is:

1. A receiver comprising:
a decoder for receiving a digital broadcast from a transmitter, the digital broadcast including a program information organized by the condition including at least one pair of a predetermined search condition and a program identifier, the predetermined search condition being set by the transmitter, the program identifier satisfying the search condition;
a search condition memory storing search conditions defined by the receiver;
a screening section for extracting the program identifier of the program satisfying the search condition from the program information organized by the search condition;
a first search-result memory for storing the search condition and the program identifier of the program satisfying the search condition extracted by the screening section;
an output section for displaying the program satisfying the search condition stored in the first search-result memory;
a program data storage for storing a program information extracted from the digital broadcast;
an input section through which a search condition is input by a viewer;
a search section for searching the program data storage for a program satisfying the search condition supplied through the input section;
a second search-result memory for storing the program supplied from the search section and satisfying the search condition; and
a selecting section for selecting one of content stored in the first search-result memory and content stored in the second search-result memory, wherein when the search condition is supplied through the input section,
the selecting section selects content stored in the first search-result memory if the first search-result memory stores a pair of the predetermined search condition and the program identifier of the program satisfying the search condition supplied through the input section, or
the selecting section selects content stored in the second search-result memory, having the search section to search the program data storage for a program satisfying the search condition supplied through the input section, if the first search-result memory stores no pair of the predetermined search condition and the program identifier of the program satisfying the input search condition supplied through the input section.

2. A receiver comprising:
a decoder for receiving a digital broadcast from a transmitter, and extracting a data multiplexed on the digital broadcast wave;
a program data storage for storing a program information extracted from the digital broadcast;
an input section through which a search condition is input by a viewer;
a search condition memory storing the search condition which is input through the input section;
a screening section for extracting a program identifier of a program satisfying the search condition stored in the search condition memory, from a program information organized by condition including at least one pair of a predetermined search condition and the program identifier of the program satisfying the predetermined search condition, the program information organized by condition being extracted by the decoder;
a first search-result memory for storing the search condition and the program identifier of the program satisfying the search condition, extracted by the screening section;
a search section for searching the program data storage for the program satisfying the search condition supplied through the input section;
a second search-result memory for storing the program supplied from the search section and satisfying the search condition;
a selecting section for selecting one of content stored in the first search-result memory and content stored in the second search-result memory; and
an output section for displaying the program selected by the selecting section,
wherein when the search condition is supplied through the input section,
the selecting section selects content stored in the first search-result memory if the first search-result memory stores a pair of the predetermined search condition and the program identifier of the program satisfying the search condition supplied through the input section, or
the selecting section selects content stored in the second search-result memory, having the search section to search the program data storage for a program satisfying the search condition supplied through the input section, if the first search-result memory stores no pair of the predetermined search condition and the program identifier of the program satisfying the input search condition supplied through the input section.

* * * * *